United States Patent [19]

Gretz

[11] Patent Number: 5,539,152
[45] Date of Patent: Jul. 23, 1996

[54] CABLE CONNECTOR

[75] Inventor: Thomas J. Gretz, Clarks Summit, Pa.

[73] Assignee: Arlington Industries, Inc., Scranton, Pa.

[21] Appl. No.: 394,389

[22] Filed: Feb. 24, 1995

[51] Int. Cl.⁶ ................................................. H02G 3/18
[52] U.S. Cl. ...................... 174/65 R; 285/162; 248/56
[58] Field of Search ........................ 174/65 R; 285/158, 285/162; 248/56

[56] References Cited

U.S. PATENT DOCUMENTS

| 2,490,286 | 12/1949 | Tornblom | 285/6.5 |
| 4,157,799 | 1/1979 | Simon | 248/56 |
| 4,536,613 | 8/1985 | Gallas | 174/65 R |
| 4,995,647 | 2/1991 | Carey | 285/161 |
| 5,171,164 | 12/1992 | O'Neil et al. | 439/552 |

FOREIGN PATENT DOCUMENTS

| 480333 | 1/1952 | Canada . |
| 686127 | 5/1964 | Canada . |

*Primary Examiner*—Kristine L. Kincaid
*Assistant Examiner*—Michael J. Cornelison

[57] ABSTRACT

A cable connector having a lower profile improves connection of cables to junction boxes where there are space limitations near the box. The connector is of a simpler design than the existing art and therefore can be economically mass produced and easily assembled in an automated manufacturing line.

3 Claims, 4 Drawing Sheets

5,539,152

CABLE CONNECTOR

FIELD OF THE INVENTION

This invention relates to a cable connector and more specifically to an improved cable connector that is easier to fasten in tight spaces as a result of a lower profile and is easier to mass manufacture.

BACKGROUND OF THE INVENTION

There are many devices commonly used to connect electrical cable to junction boxes. One of these connectors most often used has a cylindrical body for accepting a cable and a screw transverse to the longitudinal axis through the cylinder. The screw on this connector tightens onto an L-shaped saddle with the long end of the L extending from an opening in the side of the cylinder. The long end of the L on the saddle serves to guide the bottom end of the saddle, or short end of the L, as it is tightened to keep it in proper alignment with the cable.

A second popular style of connector employs a saddle that is half a cylinder in shape. A third style of connector has a saddle that goes through one hole in the top of the fitting and a gripper part that goes behind the fitting.

SUMMARY OF THE INVENTION

This invention provides an electrical connector that is easy to mass produce and is easily applied in the field. The connector has a lower profile than existing connectors to permit its application in tightly confined spaces.

OBJECTS AND ADVANTAGES

It is an object of the present invention to provide an electrical connector that may be easily and cheaply mass produced. One of the connectors most commonly used at this time is a cylindrical fitting having a screw that tightens into the side of the cylinder. The screw is seated in an L-shaped saddle within the cylinder. The long end of the L projects up through an opening in the cylinder in close proximity to the screw. As the screw is tightened, the long end of the L on the saddle serves to keep the bottom end of the saddle in alignment so that it tightens properly upon the cable.

One disadvantage of this connector is that it is difficult to automate its assembly. To fit the long end of the L-shaped saddle into the center of the fitting and through the side opening in the cylinder, the L-shaped saddle must be tipped on its side and angled such that the long end of the L will fit through the side opening of the cylinder. This is a difficult fit and it is hard to automate on a production line.

A second object of the present invention is to provide an electrical connector that is of a low profile and will thereby more easily fit in tightly confined spaces around junction boxes. When space is restricted, present connectors are often difficult to connect to junction boxes as a result of their high profile. In the connector mentioned above the long end of the L-shaped saddle and the cable fastening screw extend farther from the connector body than does the screw in the present invention.

Another object of the present invention is to provide a cable connector that requires less metal to form the saddle which thereby reduces production cost. Another popular connector on the market requires more metal for the saddle as a result of the fitting and the saddle being longer to keep the saddle from flopping around when the connector is turned on its side.

A further object is to provide a saddle of a shape which is easier to fabricate during manufacturing. As a result of its simple design, the saddle of the present invention is much easier to form than the L-shaped saddle or the half-cylindrical shaped saddle.

Other objects and advantages of the present invention will be better understood from the following description when read in conjunction with the appropriate drawings.

DESCRIPTION OF THE INVENTION

Figure 5:
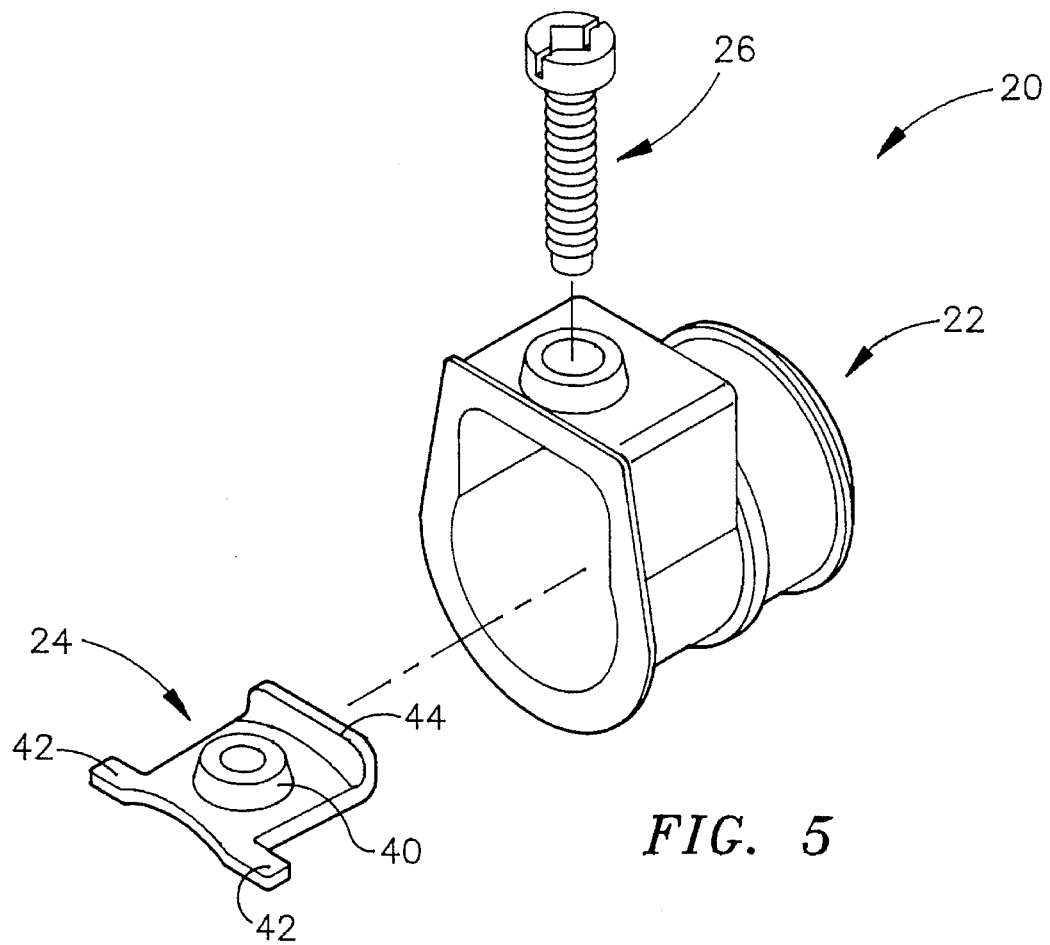
FIG. 5 is an exploded perspective view of the present invention depicting the fitting, saddle and screw.

The present invention comprises a connector for attaching a cable to an electrical junction box. An exploded view showing the various parts of the connector is shown in FIG. 5. The connector 20 includes a cylindrical fitting 22, a screw 26, and a saddle 24.

Figure 1:
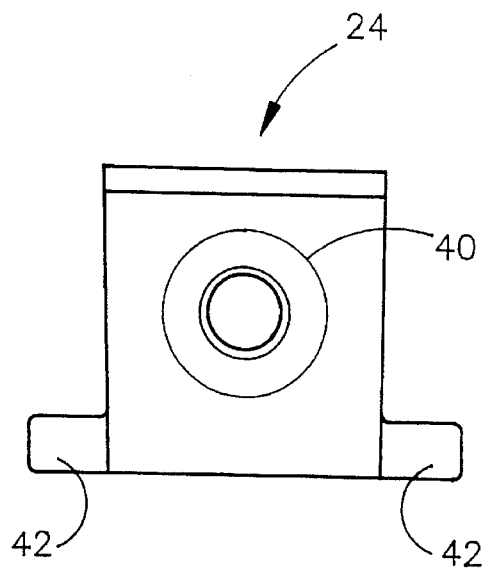
FIG. 1 is a top view of the saddle of the invention.
Figure 2:
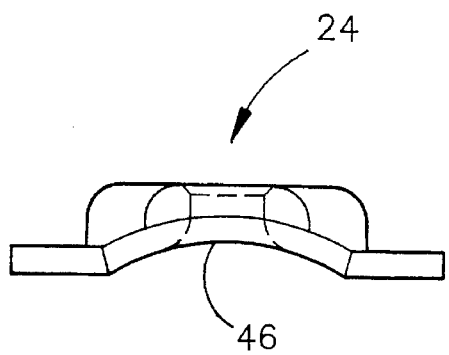
FIG. 2 is an end view of the saddle of FIG. 1.
Figure 3:
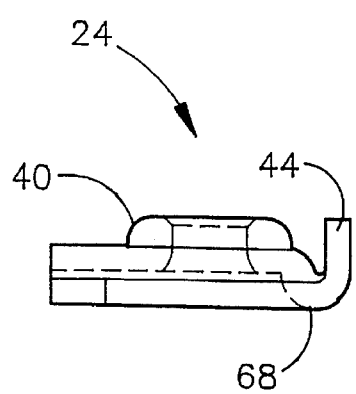
FIG. 3 is a side view of the saddle of FIG. 1.

A top view of the saddle 24 is shown in FIG. 1. The saddle 24, which can easily be stamped out of metal, includes a boss 40 and two wings 42. The wings 42 guide the saddle 24 in its travel after it is inserted within the fitting and held in place with the screw. FIG. 2, an end view of the saddle 24, shows the contoured seat 46 which is shaped to provide an accommodating surface for gripping an electrical cable. The saddle 24 also includes an upturned edge 44 as shown in FIG. 3.

Figure 4:
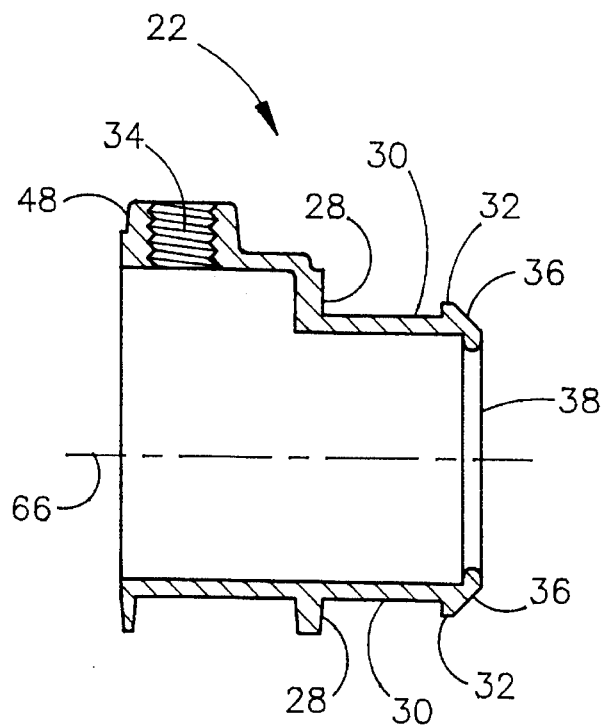
FIG. 4 is a cross-sectional side view of the fitting of the invention.

The fitting 22, shown in a cross-sectional side view in FIG. 4, includes an annular seat 30 defined by shoulder 28 and flange 32. The fitting 22 includes an insertion end 38 with an inclined edge 36 to assist centering the insertion end of the fitting as it is inserted into a junction box. A raised portion 48 of the fitting includes a threaded passageway 34.

Figure 6:
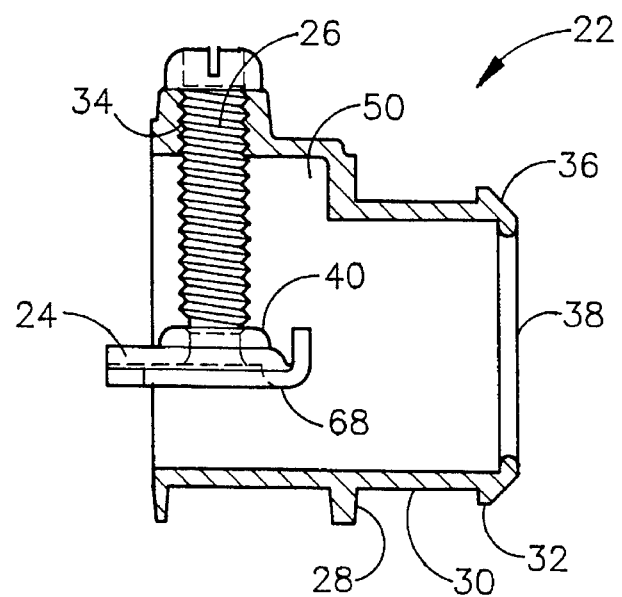
FIG. 6 is a cross-sectional view of the connector of the present invention taken along line 6—6 of FIG. 9.
Figure 7:
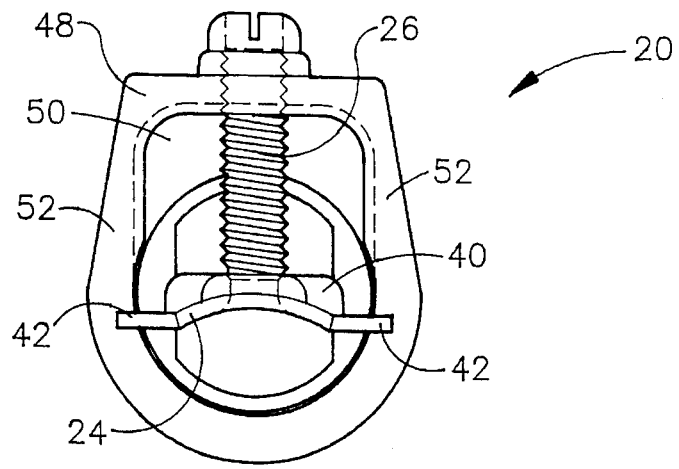
FIG. 7 is an end view of the connector of the present invention shown as it appears from the exterior of the junction box.
Figure 9:
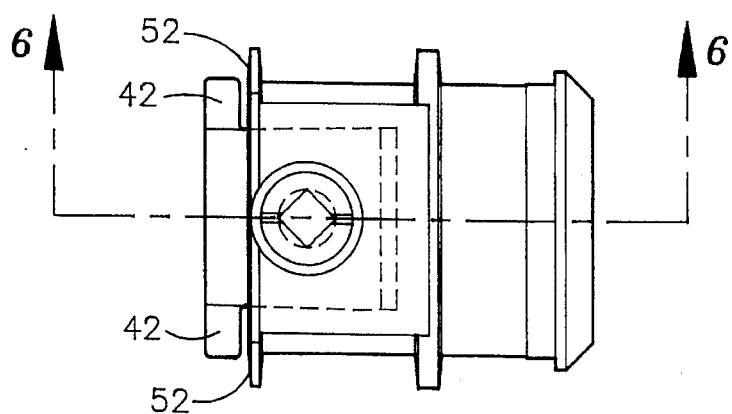
FIG. 9 is a top view of the connector of FIG. 7.

The fitting 22, screw 26, and saddle 24 are depicted in FIG. 6, a cross-sectional view of the connector taken along line 6—6 of FIG. 9. The screw 26 is threaded through passageway 34 and seated in boss 40 such that it is loosely staked in an aperture in the boss in a manner that the screw is free to rotate axially with respect to the saddle and carry the saddle with it. When the screw is turned fully counterclockwise, the saddle 24 raises into chamber or recess 50 and allows insertion of a cable into the fitting 22. As shown in FIG. 7, an end view of the fitting from the end that will be mounted external of the junction box, the two wings 42 ride on the external edge 52 of the fitting 22 thereby keeping it from rotating as screw 26 is turned. Thus the wings 42 keep the screw 26 in vertical alignment with respect to the saddle as it is tightened or retracted and prevents or stops the saddle from being inserted into the fitting beyond the point where the wings contact the external edge 52. The raised portion 48 is open on the external edge 52 of the fitting to allow the boss 40 of the saddle 24 to retract into the chamber 50. The wings 42 in relation to the external edge 52 of the fitting 22 are also shown in FIG. 9.

Figure 8:
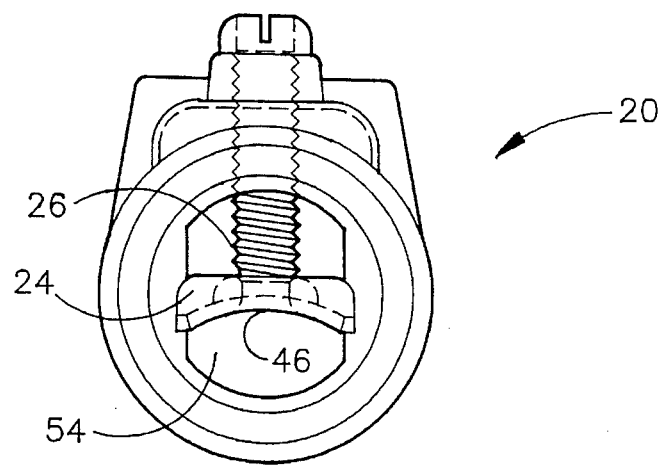
FIG. 8 is an end view of the connector of FIG. 7 shown as it appears from the end that is inserted into the junction box.

FIG. 8 depicts the connector 20 as viewed from the insertion end. The opening 54 in the insertion end provides space for a cable to feed through the connector and into the junction box.

Figure 10:
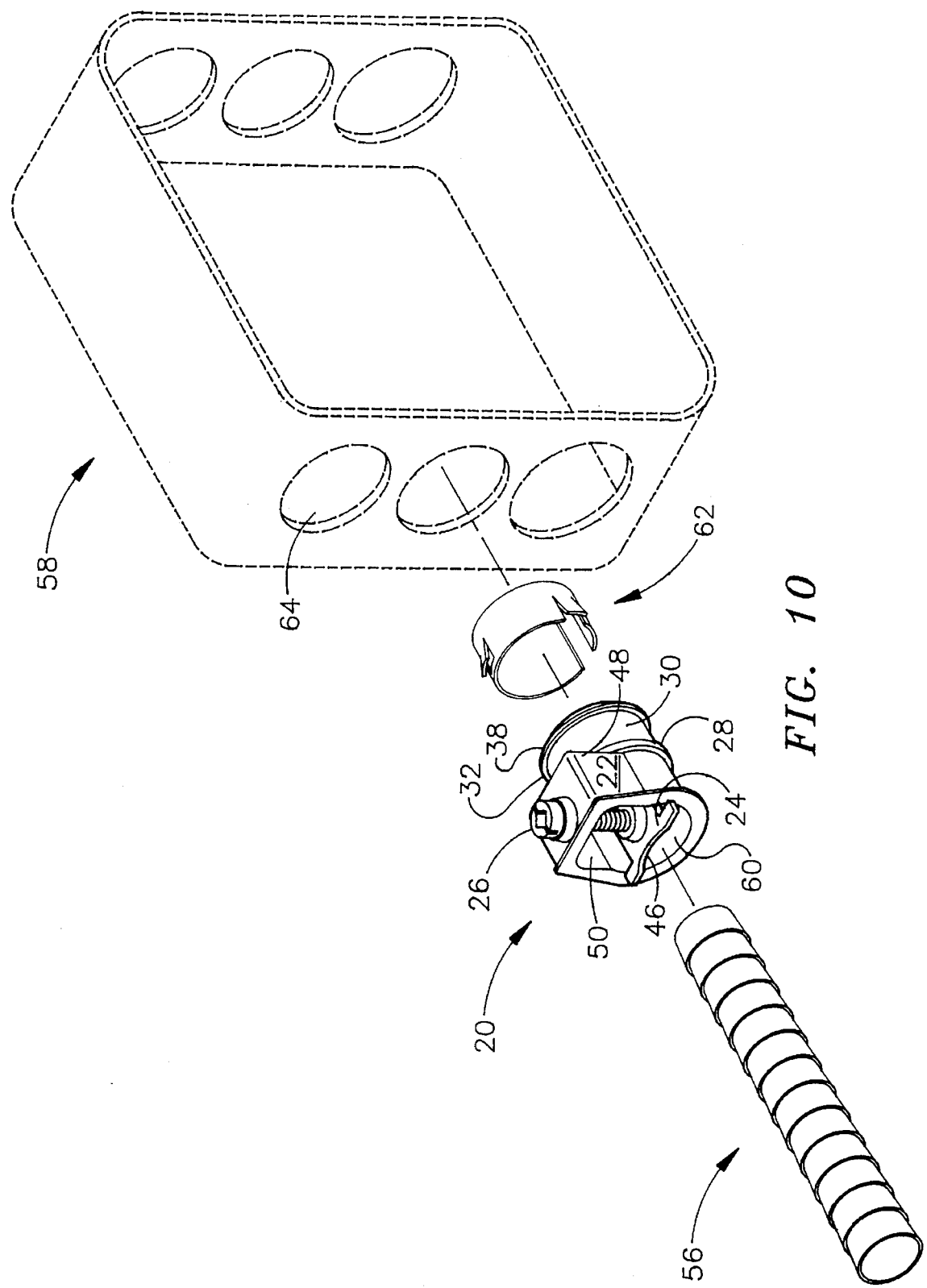
FIG. 10 is an exploded perspective view of the present invention showing the connector, a cable, a spring steel clip, and a junction box and their relationship prior to tightening the connection.

FIG. 10 is an exploded perspective view showing the cable 56, connector 20, spring steel clip 62 and junction box 58 prior to tightening the connector to the cable and inserting the connector into the junction box. A spring steel clip 62 is slipped onto seat 30 between the shoulder 28 and flange 32 of the fitting 22. The insertion end 38 of the fitting 22 is then pressed into an access hole 64 in the junction box 58 locking it in place. To insert the cable 56 the screw 26 is first turned counterclockwise to retract the saddle 24 into the chamber 50 within the raised portion 48 of the fitting 22. A cable 56 is then inserted into the open bore 60 of the fitting the desired amount. The bore has an axial center 66 running therethrough. Screw 26 is then tightened bringing the contoured seat 46 of the saddle 24 in contact with the cable 56. The screw 26 is further tightened until a firm but non-invasive grip is applied to the cable 56. The connector 20 thereby locks the cable 56 in place and prevents the cable from being pulled out of the junction box 58.

The upturned edge has a rounded projection 68 extending inwardly to assist in clamping the cable. The top of the edge 44 is level with the top of boss 40. The low profile of the saddle 24 permits a shortened chamber 50 and permits the saddle to be readily inserted and staked to the end of screw 26 permitting a more productive automatic assembly.

Having thus described the invention with reference to a preferred embodiment, it is to be understood that the invention is not so limited by the description herein but is defined as follows by the appended claims.

What is claimed is:

1. A cable connector comprising:

a generally cylindrical single piece fitting having an insertion end and an external end and a bore having an axial center extending therethrough;

an external edge at said external end;

a raised portion on the external circumference of said cylindrical fitting at said external end, said raised portion having a passageway therethrough, said passageway threaded internally, said raised portion furthermore defining an interior chamber adjoining said bore and open at said external end;

a screw threaded through said passageway in said raised portion of said fitting; said screw oriented to perpendicularly intersect the axial center of said bore;

a saddle located adjacent said external end and movable within said bore and said chamber and connected to said screw such that said screw may be rotated axially with respect to said saddle whereby rotation of said screw in a first direction causes said saddle to retract into said interior chamber defined by said raised portion and rotation of said screw in a direction opposite to said first direction causes said saddle to advance toward the interior of said fitting so that a cable located within said bore will be locked in place by further tightening of said screw until said saddle is tight against the cable;

wings on said saddle which extend out of said external end that are spaced apart a distance greater than the width of said bore and move along sid external edge as said screw is rotated to retract and advance said saddle; and said saddle being generally rectangular in shape and contained entirely within said chamber and said bore except for said wings which extend out of said external end, said saddle having an upper surface and a lower surface and including a raised boss extending from said upper surface approximate the center of said rectangular saddle, said saddle furthermore contoured across the transverse dimension of said rectangular shape such that said upper surface is a convex surface and said lower surface is a concave surface.

2. The cable connector of claim 1 wherein said saddle contains an upturned edge which is opposite said external end containing said wings, said upturned edge having a rounded projection extending inwardly to assist in clamping the cable.

3. The cable connector of claim 1 further comprising a seat for accepting a cylindrical spring steel clip, said seat formed by a shoulder consisting of a projection around the circumference of the central portion of said fitting and by a flange on said insertion end of said fitting, said spring steel clip including gripping tabs whereby insertion of said spring steel clip on said seat and subsequent insertion of insertion end of fitting within an appropriately sized access hole in a junction box will cause fitting to lock into place in the junction box.

\* \* \* \* \*